United States Patent
Kim et al.

(10) Patent No.: US 11,713,498 B2
(45) Date of Patent: Aug. 1, 2023

(54) METHOD OF MANUFACTURING URANIUM TARGET TO BE SOLUBLE IN BASIC SOLUTION AND METHOD OF EXTRACTING RADIOACTIVE MO-99 USING THE SAME

(71) Applicant: Korea Atomic Energy Research Institute, Daejeon (KR)

(72) Inventors: Ki Nam Kim, Daejeon (KR); Sung Chan Park, Daejeon (KR); Yong Jin Jeong, Daejeon (KR); Kyu Hong Lee, Sejong-si (KR); Sung Hwan Kim, Daejeon (KR); Tae Won Cho, Ulsan (KR); Jong Man Park, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 499 days.

(21) Appl. No.: 16/773,779

(22) Filed: Jan. 27, 2020

(65) Prior Publication Data

US 2020/0368820 A1    Nov. 26, 2020

(30) Foreign Application Priority Data

May 22, 2019   (KR) .................... 10-2019-0059872

(51) Int. Cl.
  *C22C 43/00*    (2006.01)
  *B22F 3/18*     (2006.01)
  *B22F 3/02*     (2006.01)
  *B22F 3/24*     (2006.01)
  *C22B 60/02*    (2006.01)

(52) U.S. Cl.
  CPC ................ *C22C 43/00* (2013.01); *B22F 3/02* (2013.01); *B22F 3/18* (2013.01); *B22F 3/24* (2013.01); *C22B 60/0252* (2013.01); *B22F 2003/185* (2013.01); *B22F 2003/248* (2013.01)

(58) Field of Classification Search
  CPC ....................................................... B22F 3/18
  See application file for complete search history.

(56) References Cited

U.S. PATENT DOCUMENTS

| 2,917,383 A | 12/1959 | Saller et al. |
| 4,705,577 A | 11/1987 | Ondracek et al. |
| (Continued) | | |

FOREIGN PATENT DOCUMENTS

| AU | 2014280928 B2 * | 2/2016 |
| EP | 2681744 B1 | 1/2016 |
| (Continued) | | |

OTHER PUBLICATIONS

Espacenet machine translation of KR-101460690-B1 retrieved on May 3, 2022 (Year: 2014).*

*Primary Examiner* — Keith D. Hendricks
*Assistant Examiner* — Joshua S Carpenter
(74) *Attorney, Agent, or Firm* — Morrison & Foerster, LLP

(57) ABSTRACT

Disclosed are a method of manufacturing a uranium target, the method including (a) a step of preparing a conjugate including a matrix and a uranium target green compact formed in the matrix; and (b) a step of performing thermo-mechanical treatment through additional heat treatment at 530° C. to 600° C. during a hot rolling pass in a process of hot-rolling the conjugate, and a method of extracting radioactive Mo-99 using the uranium target.

8 Claims, 5 Drawing Sheets

(56) References Cited

U.S. PATENT DOCUMENTS 5,694,799 A * 12/1997 Wolpert .................. B21B 27/10
72/201
2015/0340110 A1* 11/2015 Stepnik .................... G21C 3/60
419/33
2020/0234836 A1 7/2020 Park et al.

FOREIGN PATENT DOCUMENTS

| | | | |
|---|---|---|---|
| FR | 2994574 | 2/2014 | |
| KR | 10-0764902 | 10/2007 | |
| KR | 10-1138445 | 4/2012 | |
| KR | 10-1460690 | 11/2014 | |
| KR | 101460690 B1 * | 11/2014 | .............. G21D 5/00 |
| KR | 10-1640237 | 7/2016 | |
| WO | WO 2012/121466 | 9/2012 | |

\* cited by examiner

METHOD OF MANUFACTURING URANIUM TARGET TO BE SOLUBLE IN BASIC SOLUTION AND METHOD OF EXTRACTING RADIOACTIVE MO-99 USING THE SAME

CROSS-REFERENCE TO RELATED APPLICATION

This application claims priority to and the benefit of Korean Patent Application No. 10-2019-0059872, filed on May 22, 2019, the disclosure of which is incorporated herein by reference in its entirety.

BACKGROUND

1. Field of the Invention

The present disclosure relates to a method of manufacturing a uranium target (particularly, a high-density and low-enriched uranium target) to be soluble in a basic solution and a method of extracting radioactive Mo-99 using the same.

2. Discussion of Related Art

Tc-99m, which is an element that accounts for about 80% of the demand for medical diagnostic radioisotopes, is an important medical radioisotope for nuclear medical disease diagnosis. Tc-99m is an artificial element that does not exist in nature and is a daughter nuclide produced by radiation decay of Mo-99. Currently, as a method of preparing Mo-99 that is the only parent nuclide of Tc-99m in the world, a method of extracting Mo-99 from a product produced by nuclear fission of uranium powder in a plate-type dispersion target is widely used. However, since Mo-99 has a very short half-life of 66 hours, a highly enriched uranium target with a concentration of 90% or higher has been used to increase productivity.

Recently, the United States and the International Atomic Energy Agency (IAEA) has focused on the nuclear non-proliferation policy of reducing the concentration of an irradiated target material, uranium, from a high concentration of about 90% to 20% or less so as to produce a medical radioisotope, Mo-99. This policy has been promoted worldwide since 1996. Accordingly, major Mo-99 producers are converting their Mo-99 production facilities using highly enriched uranium to low-enriched uranium facilities. Currently, in South Africa's SAFARI reactor and Australia's OPAL reactor, Mo-99 is being produced using dispersion targets with 20% or less of low-enriched uranium. However, since the concentration of uranium in an irradiated target material is lowered from about 90% to 20% or less, the amount of U-235 actually contained in the target is reduced by one third, compared to the case of using high-enriched uranium, which causes a decrease in a production amount of Mo-99. Thereby, research into increasing a total content of uranium in a target, rather than reducing the concentration of U-235 from 90% to a low concentration of 20%, is underway.

The Korea Atomic Energy Research Institute has manufactured a high-density dispersion target with a uranium density of 6 gU/cc using a uranium centrifugal atomization powder. However, this target consists of a metal U phase that is not dissolved in a basic solution used to produce isotopes, such as NaOH. Since such a metal U phase can only be dissolved using nitric acid, and a solution obtained after separating Mo-99 from a uranium solution, dissolved in the nitric acid, by ion adsorption, contains uranium, the solution should be classified and treated as liquid radioactive waste. Here, since the liquid radioactive waste, in which uranium is dissolved, has a small fission critical mass, it occupies a large space and causes corrosion of nearby devices and facilities due to acid fumes.

RELATED ART DOCUMENT

Patent Document

Korean Patent No. 10-1640237 (Jul. 11, 2016)

SUMMARY OF THE INVENTION

Therefore, the present disclosure has been made in view of the above problems, and it is one object of the present disclosure to manufacture a high-density and low-enriched uranium target soluble in a basic solution so as to extract radioactive Mo-99 and, accordingly, provide a method of manufacturing a uranium target, the method including (a) a step of preparing a conjugate including a matrix and a uranium target green compact formed in the matrix; and (b) a step of performing thermo-mechanical treatment through additional heat treatment at 530° C. to 600° C. during a hot rolling pass in a process of hot-rolling the conjugate.

It will be understood that technical problems of the present disclosure are not limited to the aforementioned problem and other technical problems not referred to herein will be clearly understood by those skilled in the art from the disclosure below.

In accordance with an aspect of the present disclosure, the above and other objects can be accomplished by the provision of a method of manufacturing a uranium target, the method including: preparing a conjugate including a matrix and a uranium target green compact formed in the matrix; and performing thermo-mechanical treatment through additional heat treatment at 530° C. to 600° C. during a hot rolling pass in a process of hot-rolling the conjugate.

In accordance with another aspect of the present disclosure, there is provided a method of extracting radioactive Mo-99, the method including: manufacturing the uranium target, and then dissolving the uranium target in a basic solution; and extracting radioactive Mo-99 from the basic solution containing the uranium target dissolved therein.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
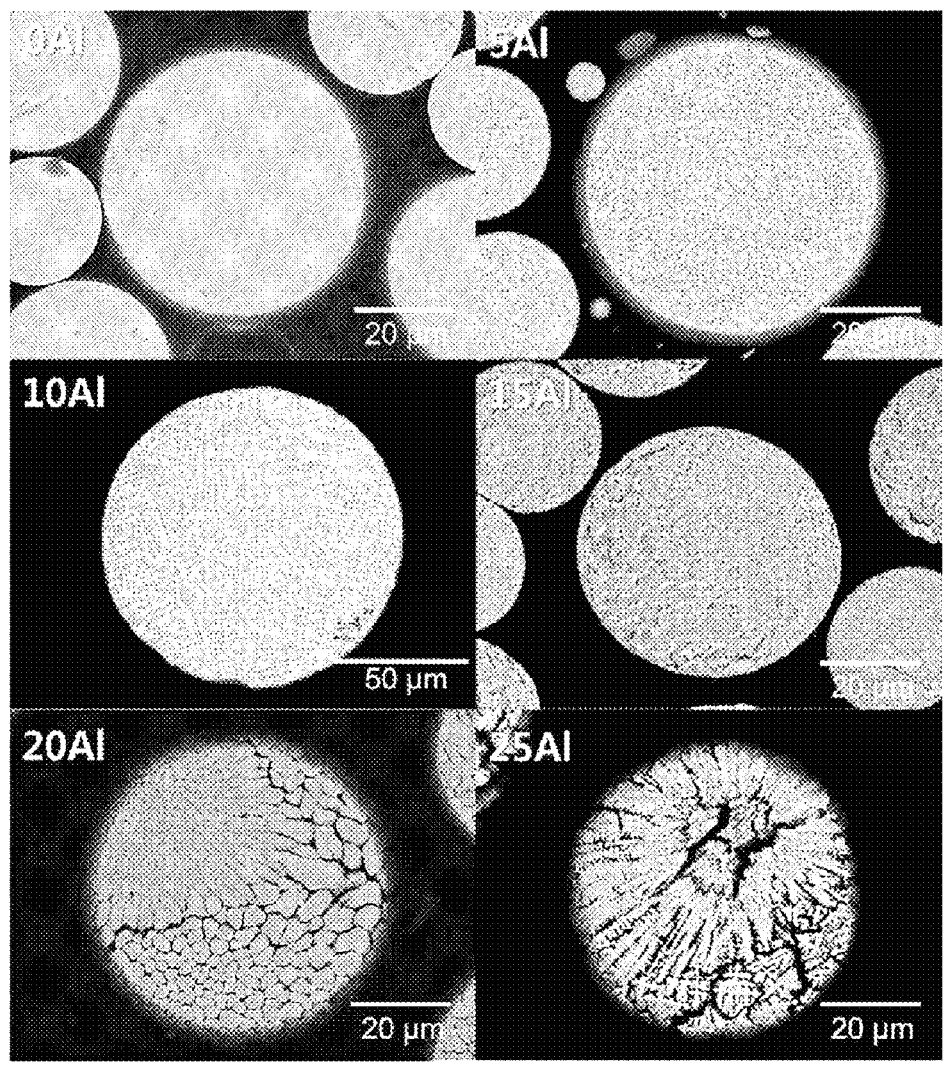
FIG. 1 illustrates SEM images of atomized U-xAl (x=0, 5, 10, 15, 20 and 25% by weight) powders.

First, the term "uranium target" used in the present specification refers to a uranium target that has undergone fission through irradiation of a uranium-containing material with neutrons and includes a fission product including radioactive Mo-99. The uranium target may be plate-shaped or annular.

Existing low-enriched uranium targets are manufactured by dispersing uranium aluminide in an aluminum matrix. Such low-enriched uranium targets have low uranium densities of about 2.6 to 2.7 gU/cm$^3$, thus having low production yields and generating more waste, compared to high-enriched uranium targets.

In addition, when a uranium target is manufactured by dispersing a uranium alloy or uranium metal having a high density in an aluminum matrix, the uranium alloy or uranium metal is not easily dissolved in a basic solution. Accordingly, a basic solution could not be used in a process of extracting radioactive Mo-99.

Accordingly, the uranium target according to the present disclosure is a high-density and low-enriched uranium target and may be dissolved in a basic solution.

In particular, the uranium target is a low-enriched uranium target and may include 20% by weight or less of U-235, which is prone to fission, of uranium isotopes. Uranium exists in the form of isotopes of U-238 and U-235. In nature, there is about 99.3% of U-238, which is not prone to fission, and about 0.7% of U-235 which is prone to fission. Here, low-enriched uranium is suitable for preventing nuclear proliferation due to a low content of U-235, compared to high-enriched uranium with a U-235 content of 90% or more.

In addition, the uranium target is characterized by having a high density. In particular, the density of the uranium target may be 3.0 gU/cm$^3$ to 10.0 gU/cm$^3$, preferably 3.0 gU/cm$^3$ to 8.0 gU/cm$^3$, but the present disclosure is not limited thereto. Due to the increased density of uranium, an extraction yield of radioactive Mo-99 may be increased.

According to a conventional method, a uranium target conjugate is subjected to hot rolling; a blister test; cold rolling and plate correction; and phase transformation heat treatment, thereby manufacturing a uranium target. When phase transformation heat treatment is separately carried out after hot rolling in such a manner, deformation and breakage of the shape of a finally produced uranium target are inevitable due to volume expansion of a uranium-aluminum alloy powder occurring during the phase transformation.

Accordingly, the present inventors have performed thermo-mechanical treatment, a blister test, cold rolling, and plate correction (that is, additional heat treatment has been performed during a hot rolling pass in a hot rolling process and separate phase transformation heat treatment has been omitted) for a uranium target conjugate, instead of the conventional method, to manufacture a uranium target, and have confirmed that a uranium target soluble in a basic solution can be manufactured without shape deformation and breakage, thus completing the present disclosure.

Hereinafter, the present disclosure is described in detail.
Method of Manufacturing Uranium Target The present disclosure provides a method of manufacturing a uranium target, the method including (a) a step of preparing a conjugate including a matrix and a uranium target green compact formed in the matrix; and (b) a step of performing thermo-mechanical treatment through additional heat treatment at 530° C. to 600° C. during a hot rolling pass in a process of hot-rolling the conjugate.

First, the method of manufacturing a uranium target according to the present disclosure includes a step [step (a)] of preparing a conjugate including a matrix and a uranium target green compact formed in the matrix.

In particular, the conjugate includes a matrix and a uranium target green compact formed in the matrix.

The matrix serves to disperse uranium aluminide and may include aluminum.

In addition, the high-density and low-enriched uranium target green compact may be prepared by mixing and compacting a uranium-aluminum alloy powder and an aluminum powder. The content of the aluminum in the uranium-aluminum alloy powder may be 20% by weight or less. In other words, the high-density and low-enriched uranium target green compact may be manufactured by mixing and compacting a uranium-aluminum alloy powder and an aluminum powder. In particular, the uranium-aluminum alloy powder may be mixed in a content of 60% by volume or less, preferably 10% by volume to 50% by volume, with respect to the sum of the uranium-aluminum alloy powder and the aluminum powder. Here, the mixing may be performed at 10 rpm to 100 rpm for 1 hour to 10 hours, and the compacting may be performed for a compression time of 60 seconds to 180 seconds and a decompression time of 30 seconds to 120 seconds under a pressure of 50 ton to 200 ton.

Meanwhile, the matrix and the high-density and low-enriched uranium target green compact may be joined to form a conjugate by welding. Here, the welding may be performed at a current of 100 A to 200 A and a voltage of 5 V to 20 V.

Next, the method of manufacturing a uranium target according to the present disclosure includes a step [step (b)] of performing thermo-mechanical treatment through additional heat treatment at 530° C. to 600° C. during a hot rolling pass in a process of hot-rolling the conjugate.

In particular, the thermo-mechanical treatment refers to additional heat treatment performed during a hot rolling pass in a process of hot rolling.

The hot rolling through the hot rolling pass is a conventional method. Here, a surface temperature of the hot roll may be 80° C. to 100° C.

Before performing the hot rolling pass, preheating may be performed at 480° C. to 520° C. for 10 minutes to 1 hour. In addition, the number of hot rolling passes is preferably 5 to 10, and a reduction ratio per pass is preferably 10% to 30%, but the present disclosure is not limited thereto. Here, between the hot rolling passes, a step of reheating at 480° C. to 520° C. for 1 minute to 20 minutes may be additionally included.

The additional heat treatment is performed at 530° C. to 600° C., preferably 540° C. to 600° C., during the hot rolling pass, but the present disclosure is not limited thereto. Here, when the temperature of the additional heat treatment is too low, a U or UAl$_2$ phase of the conjugate may not be changed to a UAl$_3$ or UAl$_4$ phase. When the temperature of the additional heat treatment is too high, Al (melting point: 658° C.) may be melted, whereby damage to the uranium target is inevitable.

In addition, the additional heat treatment may be performed for a total of 5 hours to 20 hours. To sufficiently change a U or UAl$_2$ phase to a UAl$_3$ or UAl$_4$ phase, the additional heat treatment is preferably performed for a total of 7 hours to 20 hours, but the present disclosure is not limited thereto.

Meanwhile, the additional heat treatment may be performed for a single hot rolling pass or over multiple hot rolling passes. When the additional heat treatment is slowly performed over multiple hot rolling passes, deformation, etc. due to the additional heat treatment may be prevented.

In other words, when the thermo-mechanical treatment is performed through additional heat treatment during a hot rolling pass in a process of hot rolling, a U or UAl$_2$ phase in the conjugate may be changed to a UAl$_3$ or UAl$_4$ phase.

Meanwhile, when hot rolling is performed without additional heat treatment as in a conventional method, a U or UAl$_2$ phase becomes present in a finally produced uranium target, so that dissolution in a basic solution is not accomplished. When phase transformation heat treatment is performed after hot rolling so as to address the problems, the volume of a uranium-aluminum alloy powder expands during phase transformation, resulting in deformation and breakage of the shape of a finally produced uranium target.

After the thermo-mechanical treatment, a blister test and cold rolling may be additionally performed. On the other hand, after the thermo-mechanical treatment, a separate phase transformation heat treatment may be omitted.

Method of Extracting Radioactive Mo-99

The present disclosure provides a method of extracting radioactive Mo-99, the method including a step of manufacturing a uranium target, and then dissolving the same in a basic solution; and a step of extracting radioactive Mo-99 from the basic solution containing the uranium target dissolved therein.

First, in the method of extracting radioactive Mo-99 according to the present disclosure, the uranium target is dissolved in a basic solution, thereby preparing a basic solution including uranium aluminide and a fission product.

Since there is no U or UAl$_2$ phase in the uranium target, the uranium target has an advantage of being easily dissolved in a basic solution. When such a basic solution is used, solid waste is generated, and thus the amount of waste is small, unlike the case in which an acidic solution is used. Since the solid waste may be immediately stored, there is an advantage of easy handling.

The basic solution may be any known basic solution and is preferably a sodium hydroxide (NaOH) solution, but the present disclosure is not limited thereto.

Next, in the method of extracting radioactive Mo-99 according to the present disclosure, radioactive Mo-99 is extracted from the basic solution in which the uranium target has been dissolved. Here, since the density of uranium is increased, an extraction yield of radioactive Mo-99 may also be increased. In addition, a nuclear proliferation problem may be prevented due to use of the low-enriched uranium.

The extraction may be performed using various known methods such as adsorption, chromatography, precipitation separation, and ion exchange.

As described above, the method of manufacturing a uranium target according to the present disclosure includes (a) the step of preparing a conjugate including a matrix and a uranium target green compact formed in the matrix; and (b) the step of performing thermo-mechanical treatment through additional heat treatment at 530° C. to 600° C. during a hot rolling pass in a process of hot-rolling the conjugate. Accordingly, a U or UAl$_2$ phase in the conjugate may be changed to a UAl$_3$ or UAl$_4$ phase through the thermo-mechanical treatment.

Therefore, the uranium target manufactured according to the method is a high-density and low-enriched uranium target and may be dissolved in a basic solution without shape deformation and breakage, so that radioactive Mo-99 may be efficiently extracted.

Now, the present disclosure will be described in more detail with reference to the following preferred examples. These examples are provided for illustrative purposes only and should not be construed as limiting the scope and spirit of the present disclosure.

Example

Experimental Methods
(1) Preparation of Atomized U—Al Powder

The Korea Atomic Energy Research Institute manufactured U-xAl (x=0, 5, 10, 15, 20 and 25% by weight) alloy powders using the centrifugal atomization technology. First, U and Al ingots were prepared, and arc-melted together in an Ar atmosphere to avoid thermal shock. Next, a U—Al master alloy was fed into a ZrO$_2$ crucible, followed by heating at a temperature of 300° C. higher than a melting point of the intermetallic compound to increase the fluidity of the molten metal. Finally, the molten metal was fed onto a rotating graphite disk. Through the rotating graphite disk, numerous small droplets were produced. The droplets were dispersed toward a chamber and cooled very quickly. The microstructures and constituent phases of produced powders were confirmed using SEM/EDS and XRD.

TABLE 1

| U—xAl | Weight (g) of U—Al | Volume (cm$^3$) of U—Al | Volume (cm$^3$) of Al | Weight (g) of Al | U-Al % by volume |
|---|---|---|---|---|---|
| U—0Al | 18.55 | 0.97 | 4.14 | 12.43 | 16.93 |
| U—5Al | 19.58 | 1.47 | 3.65 | 11.10 | 25.53 |
| U—10Al | 20.68 | 2.15 | 2.97 | 9.26 | 37.34 |
| U—15Al | 21.78 | 2.48 | 2.64 | 7.75 | 43.06 |
| U—20Al | 23.24 | 2.97 | 2.15 | 5.81 | 51.59 |
| U—25Al | 24.28 | 3.42 | 1.70 | 3.96 | 59.53 |

(2) Manufacture of High-Density Dispersion Targets

High-density dispersion targets having a uranium density of 3.2 gU/cm$^3$ were manufactured using atomized U-xAl (x=0, 5, 10, 15 and 20% by weight) powders. To limit a U—Al powder volume percentage in a target, U-25Al was excluded based on Table 1. Next, targets were manufactured using typical plate fuel manufacturing procedures including mixing with a Al powder, compaction, TIG welding, hot rolling, a blister test, and cold rolling. Here, heat treatment was performed at 550° C. during a hot rolling pass in a process of hot rolling a conjugate to change U and UAl$_2$ phases to UAl$_3$ and UAl$_4$ phases. Constituent phases were confirmed using XRD.

Mixing conditions: Mixed in a TURBULA shaker-mixer (34 rpm) for 3 hours

Compaction conditions: Included a compaction pressure of 90 ton (9.6/cm$^2$), a compression time of 90 seconds, and a decompression time of 60 seconds so as to produce green compacts having a size of about 38.7 mm×33.5 mm×4.4 mm, a weight of about 29.5 g, a theoretical density of 5.522 g/cm³, a measured density of about 5.3 g/cm³, and a relative density of about 96%.

TIG welding conditions: Current: 140 to 150 A, voltage: 10 V

Hot rolling conditions: An initial thickness of a conjugate: 8.9 mm, preheating at 500° C. for 50 minutes. A hot rolling pass (surface temperature: 88 to 90° C., speed: 10 rpm) summarized in Table 2 below was performed six times.

TABLE 2

| Hot rolling pass | Reduction ratio (%) | Target thickness (mm) | Reheating time (m) |
|---|---|---|---|
| Pass 1 | 25 | 6.68 | 10 |
| Pass 2 | 25 | 5.01 | 10 |
| Pass 3 | 25 | 3.75 | 10 |
| Pass 4 | 25 | 2.81 | 5 |
| Pass 5 | 25 | 2.11 | 5 |
| Pass 6 | 16 | 1.77 | 5 |

Blister test: Heating was performed at 500° C. for one hour, and surface and bonding states were confirmed to be satisfactory.

Cold rolling condition: Final target thicknesses (1.52 to 1.62 mm) were accomplished Results and Discussion (1) Preparation of Atomized U—Al Powders Atomized U—Al powders were successfully prepared. FIG. 1 illustrates microstructures of the powders. Due to the addition of Al, precipitates having a dendrite structure were formed. As the content of the Al composition increases, the dendrite structure became clearer. As shown in FIG. 1, significant cracks occurred along a grain boundary when the content of the Al composition was higher than 20% by weight. In this content range, an a-U phase was completely consumed and only $UAl_2$ and $UAl_3$ phases were present, which might cause cracks due to a volumetric shrinkage difference between the uranium and aluminum phases.

Figure 2:
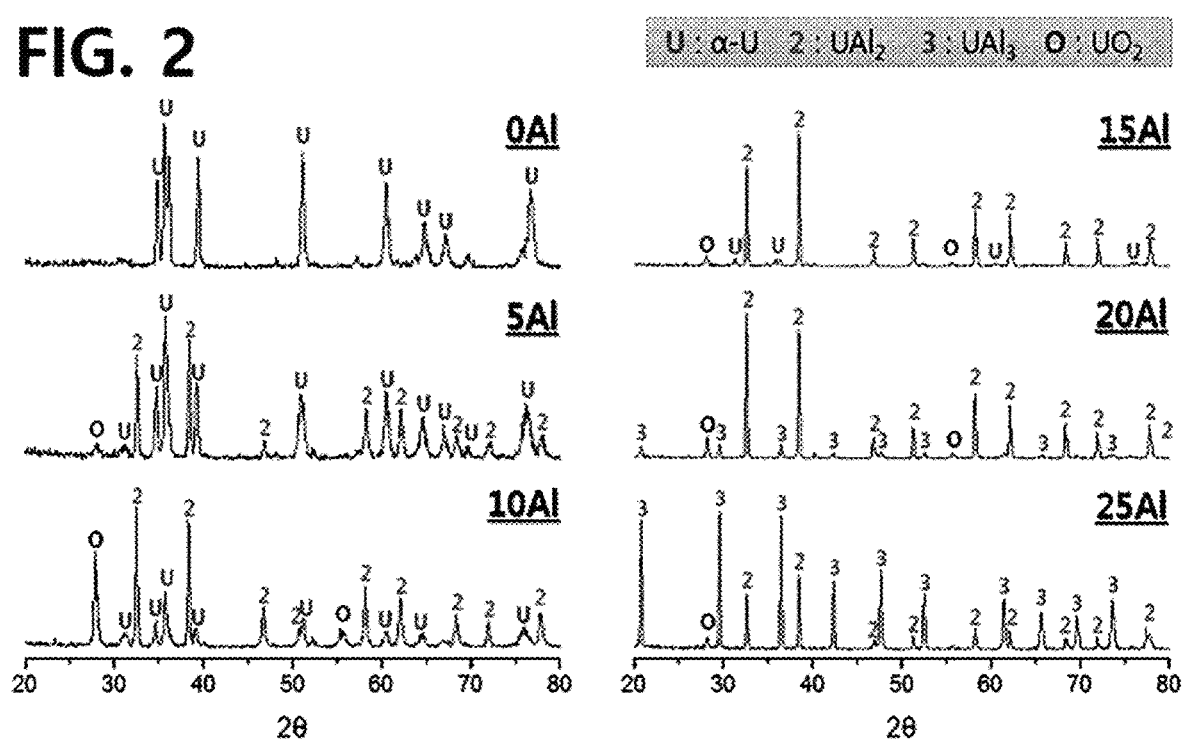
FIG. 2 illustrates XRD results of atomized U-xAl (x=0, 5, 10, 15, 20 and 25% by weight) powders.

Previous studies have shown that a U—Al powder consists of complex intermetallic phases. FIG. 2 illustrates XRD results of atomized U—Al powders. In the atomized powders, three phases, i.e., α-U, $UAl_2$, and $UAl_3$ phases, were observed. Due to the addition of Al, a $UAl_2$ precipitate was formed in an α-U matrix including less than 15% by weight of Al. When the content of Al was 20 to 25% by weight, a $UAl_3$ phase, instead of α-U, was observed.

Manufacture of Hot-Rolled Targets

Figure 3:
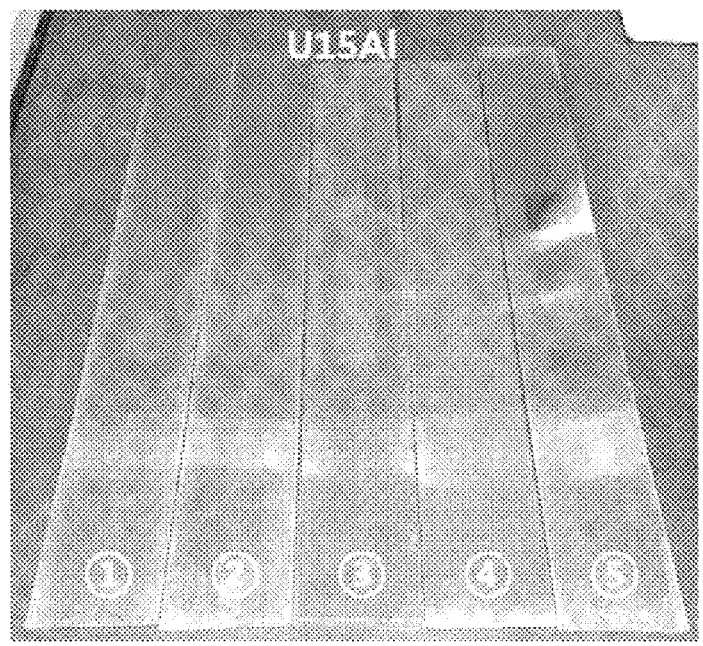
FIG. 3 illustrates images of targets manufactured using U-15Al under modified heat treatment conditions 1 to 4 (①  to ④) summarized in Table 3 and a target manufactured using U-15Al under a conventional method (phase transformation heat treatment condition: omitted, Standard Pass, ⑤)

Some conventional targets have been manufactured using U-15Al and U-10Al powders and subjected to phase transformation heat treatment (phase transformation heat treatment condition: at 550° C. for 20 hours in an air atmosphere) after hot rolling. The phase transformation caused significant volume expansion due to great deformation. To prevent such deformation, a heat treatment process was included in the hot rolling process. Table 3 shows the modified heat treatment conditions. As a result, a target was successfully manufactured without any deformation as shown in FIG. 3.

TABLE 3

| Condition | Hot rolling pass | | | | | |
|---|---|---|---|---|---|---|
| | Pass 1 | Pass 2 | Pass 3 | Pass 4 | Pass 5 | Pass 6 |
| 1 | 5 h | | | | | |
| 2 | | | 5 h | | | |
| 3 | 2 h | | 2 h | | 1 h | |
| 4 | 1 h | 1 h | 1 h | 1 h | 1 h | |

Figure 4:
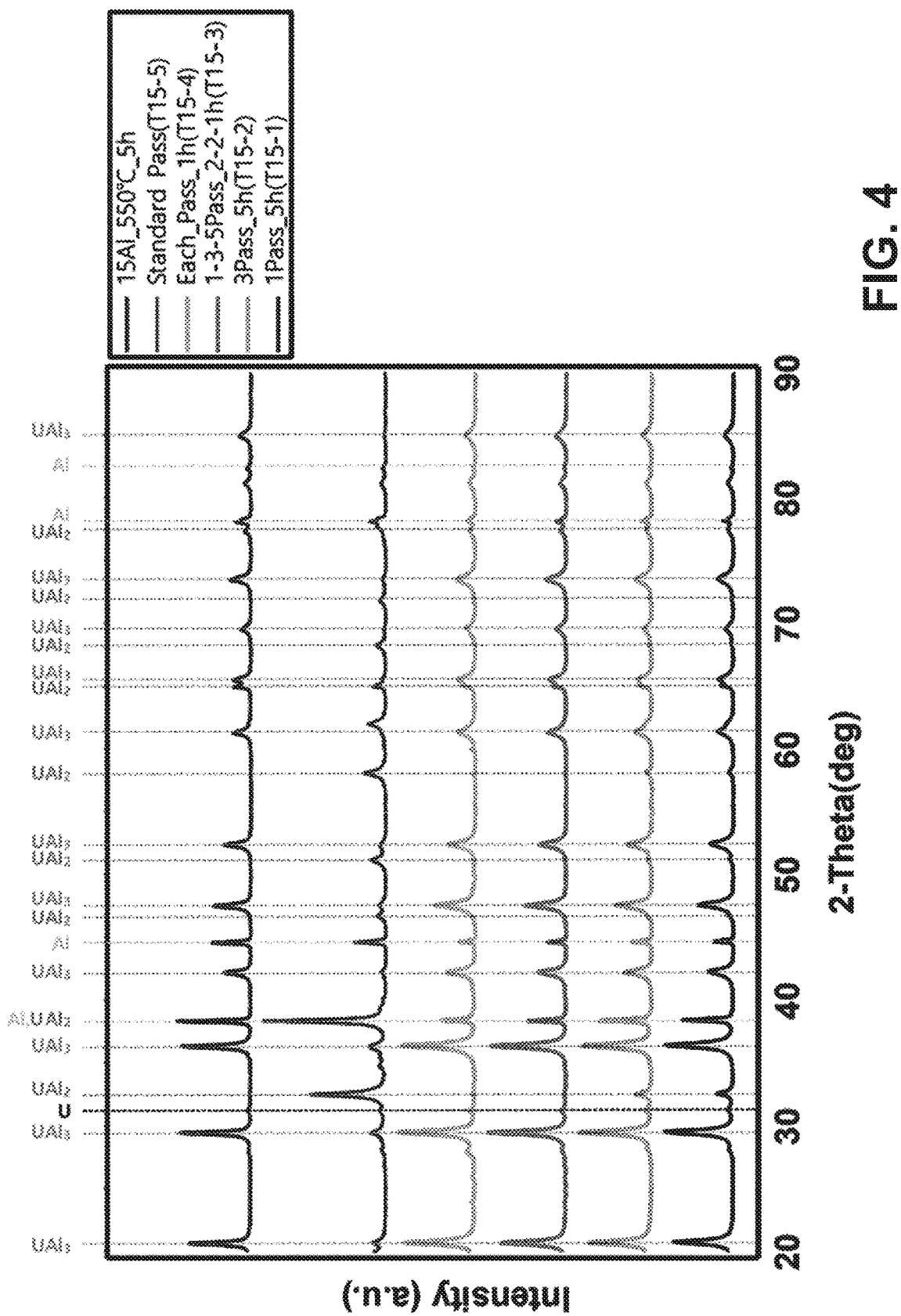
FIG. 4 illustrates an XRD data comparison result of targets manufactured using U-15Al under modified heat treatment conditions 1 to 4 (1Pass_5h, 3Pass_5h, 1-3-5Pass_2-2-1h, Each Pass_1h) summarized in Table 3 and a target manufactured according to a conventional method (a phase transformation heat treatment condition: omitted, at 550° C. for 20 hours in an air atmosphere) (Standard Pass, 15Al_550° C._5h)

FIG. 4 illustrates XRD results of targets heat-treated under modified conditions. After the manufacturing process was completed, data of the manufactured targets and heat-treated targets was compared. As a result, it was confirmed that desirable phase transformation occurred under conditions 3 (1-3-5Pass_2-2-1h) and 4 (Each Pass_1h) summarized in Table 3.

Figure 5:
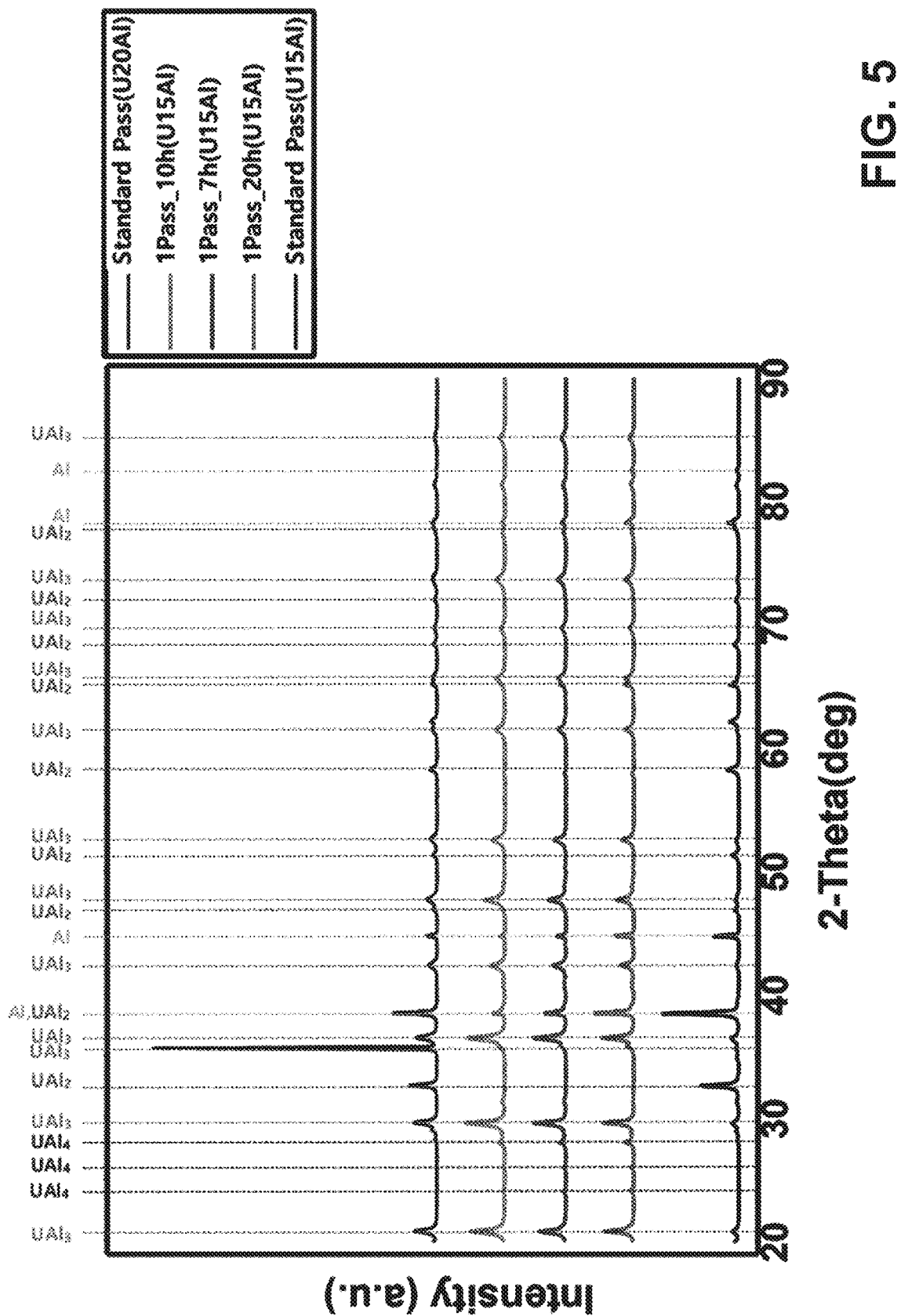
FIG. 5 illustrates an XRD data comparison result of targets manufactured using U-15Al under additionally modified heat treatment conditions (1Pass_7h, 1Pass_10h, 1Pass_20h) and a target manufactured using U-15Al and U-20Al according to a conventional method (a phase transformation heat treatment condition: omitted)(Standard Pass).

Meanwhile, as shown in FIG. 4, heat treatment performed at 550° C. for 5 hours was not sufficient to deform all $UAl_2$ phases. To determine an appropriate heat treatment time, a heat treatment time was adjusted. FIG. 5 illustrates XRD data of targets heat-treated after 7 hours, 10 hours, and 20 hours. No peak for $UAl_2$ was found in the target data. As a result, a minimum heat treatment time was confirmed as being about 7 hours at 550° C.

CONCLUSION

The Korea Atomic Energy Research Institute manufactured a high-density LEU target having a uranium density of 3.2 gU/cm³ using an atomized uranium-aluminum powder. The characteristics of the atomized powder depended upon the content of Al: the contents of Al in α-U and $UAl_2$ phases were less than 15% by weight; and the contents of Al in $UAl_2$ and $UAl_3$ phases were 20 to 25% by weight. The target was subjected to heat treatment to remove a $UAl_2$ phase. The heat treatment was performed during hot rolling so as to prevent deformation of the target. It was confirmed that heat treatment should be performed at 550° C. for 7 hours so as to cause the entire phase transformation of a $UAl_2$ phase.

As apparent from the above description, the present disclosure provides a method of manufacturing a uranium target, the method including (a) a step of preparing a conjugate including a matrix and a uranium target green compact formed in the matrix; and (b) a step of performing thermo-mechanical treatment through additional heat treatment at 530° C. to 600° C. during a hot rolling pass in a process of hot-rolling the conjugate. Accordingly, a U or $UAl_2$ phase in the conjugate can be changed to a $UAl_3$ or $UAl_4$ phase through the thermo-mechanical treatment.

Therefore, the uranium target manufactured according to the method is a high-density and low-enriched uranium target and can be dissolved in a basic solution without shape deformation and breakage, so that radioactive Mo-99 can be efficiently extracted.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure.

What is claimed is:

1. A method of manufacturing a uranium target, the method comprising:

manufacturing a uranium green compact by mixing and compacting a uranium-aluminum alloy powder and an aluminum powder, where the content of aluminum in the uranium-aluminum alloy powder is 20% by weight or less;

preparing a conjugate by combining an aluminum matrix and the uranium green compact; and performing a process of hot-rolling the conjugate comprising hot roll passes at a temperature of 530° C. to 600° C. for 7 to 20 hours.

2. The method according to claim 1, wherein the uranium target is soluble in a basic solution.

3. The method according to claim 1, wherein a content of U-235 in the uranium target is 20% by weight or less.

4. The method according to claim 1, wherein the uranium target has a density of 3.0 gU/cm$^3$ to 10.0 gU/cm$^3$.

5. The method according to claim 1, wherein a content of the uranium-aluminum alloy powder in a total of the uranium-aluminum alloy powder and the aluminum powder is 10% by volume to 50% by volume.

6. The method according to claim 1, wherein, in the performing, a surface temperature of a hot roll is 80° C. to 100° C.

7. The method according to claim 1, wherein the process of hot-rolling the conjugate is performed to change a U or $UAl_2$ phase in the conjugate to a $UAl_3$ or $UAl_4$ phase.

8. A method of extracting radioactive Mo-99, the method comprising:

manufacturing a uranium target according to the method of claim 1, and then dissolving the uranium target in a basic solution; and extracting radioactive Mo-99 from the basic solution containing the uranium target dissolved therein.

* * * * *